United States Patent
Wei et al.

(10) Patent No.: US 9,743,591 B2
(45) Date of Patent: Aug. 29, 2017

(54) RFID-BASED PLANT TRACKING AND DATA MANAGEMENT SYSTEM FOR A GREENHOUSE

(71) Applicant: Dow Agrosciences LLC, Indianapolis, IN (US)

(72) Inventors: Ning Wei, Redmond, WA (US); Douglas Beatty, Newberg, OR (US); Tyler Spurgeon, Woodburn, OR (US)

(73) Assignee: Dow AgroSciences LLC, Indianapolis, IN (US)

( * ) Notice: Subject to any disclaimer, the term of this patent is extended or adjusted under 35 U.S.C. 154(b) by 321 days.

(21) Appl. No.: 13/967,949

(22) Filed: Aug. 15, 2013

(65) Prior Publication Data
US 2014/0053462 A1    Feb. 27, 2014

Related U.S. Application Data

(60) Provisional application No. 61/692,374, filed on Aug. 23, 2012.

(51) Int. Cl.
| | |
|---|---|
| G06K 19/00 | (2006.01) |
| A01G 1/00 | (2006.01) |
| A01H 1/02 | (2006.01) |
| G05B 11/01 | (2006.01) |
| G06Q 30/00 | (2012.01) |
| G06K 19/07 | (2006.01) |
| G05B 19/418 | (2006.01) |

(52) U.S. Cl.
CPC ............... *A01G 1/001* (2013.01); *A01H 1/02* (2013.01); *G05B 11/01* (2013.01); *G05B 19/4183* (2013.01); *G06K 19/0717* (2013.01); *G06Q 30/00* (2013.01); *G05B 2219/32055* (2013.01)

(58) Field of Classification Search
USPC ........................... 235/487, 492; 340/10, 572
See application file for complete search history.

(56) References Cited

U.S. PATENT DOCUMENTS

| | | | |
|---|---|---|---|
| 6,671,698 B2 | 12/2003 | Pickett et al. | |
| 6,691,135 B2 | 2/2004 | Wagner et al. | |
| 6,745,127 B2 | 6/2004 | Crosby | |
| 6,796,504 B2 | 9/2004 | Robinson | |
| 6,963,881 B2 | 11/2005 | Pickett et al. | |
| 7,275,683 B2 | 10/2007 | Lazarowicz et al. | |
| 7,403,855 B2 | 7/2008 | Fuessley et al. | |
| 7,761,334 B2 | 7/2010 | Pickett et al. | |

(Continued)

FOREIGN PATENT DOCUMENTS

| | | |
|---|---|---|
| DE | 1850777 | 4/1962 |
| WO | WO 00/50849 A1 | 8/2000 |
| WO | WO 2010/021825 A1 | 2/2010 |

OTHER PUBLICATIONS

International Preliminary Report on Patentability mailed Mar. 5, 2015 from the IB in related International Application No. PCT/US2013/055122.

(Continued)

*Primary Examiner* — Matthew Mikels
(74) *Attorney, Agent, or Firm* — Eric J. Kraus; Faegre Baker Daniels LLP (57) ABSTRACT

A system and method of tracking the position and status of plants or plant parts in a greenhouse or other growing area using identification tags such as RFID tags is disclosed.

22 Claims, 8 Drawing Sheets

(56) References Cited

U.S. PATENT DOCUMENTS

| | | | |
|---|---|---|---|
| 7,975,632 B2 | 7/2011 | Gogerty et al. | |
| 8,009,048 B2 | 8/2011 | Hyde et al. | |
| 8,011,133 B2 | 9/2011 | Sayers et al. | |
| 8,033,426 B2 | 10/2011 | Becker et al. | |
| 8,140,397 B2 | 3/2012 | Robinson et al. | |
| 8,258,951 B2 | 9/2012 | Hyde et al. | |
| 8,484,889 B2 | 7/2013 | Woo et al. | |
| 8,816,262 B2 | 8/2014 | Holland | |
| 2003/0182260 A1 | 9/2003 | Pickett et al. | |
| 2006/0136093 A1 | 6/2006 | Hornbaker et al. | |
| 2008/0319927 A1* | 12/2008 | Dallmier | A01H 5/10 705/400 |
| 2009/0222487 A1 | 9/2009 | Hirose et al. | |
| 2009/0252880 A1 | 10/2009 | Kurth | |
| 2010/0026492 A1 | 2/2010 | Grieco et al. | |
| 2010/0047801 A1 | 2/2010 | Cope et al. | |
| 2010/0263274 A1 | 10/2010 | Corak et al. | |
| 2011/0047042 A1 | 2/2011 | Blickhan et al. | |
| 2011/0135161 A1 | 6/2011 | Koutsky et al. | |
| 2011/0219683 A1 | 9/2011 | Sutton | |
| 2011/0309102 A1 | 12/2011 | Becker et al. | |
| 2012/0010789 A1 | 1/2012 | Dulnigg | |
| 2012/0054061 A1 | 3/2012 | Fok et al. | |
| 2013/0179204 A1* | 7/2013 | Sabarez, II | G06Q 50/02 705/7.11 |
| 2013/0184859 A1* | 7/2013 | Sell | G06Q 50/02 700/239 |

OTHER PUBLICATIONS

Supplementary European Search Report, EP 13830952, issued Mar. 17, 2016, 8 pages.
Written Opinion of the International Search Authority for PCT/US13/55122, Dec. 16, 2013, pp. 1-7, ISA/US.
International Search Report for PCT/US13/55122, Dec. 16, 2013, pp. 1-2, ISA/US.

* cited by examiner

RFID-BASED PLANT TRACKING AND DATA MANAGEMENT SYSTEM FOR A GREENHOUSE

RELATED APPLICATION

The application claims the benefit of U.S. Provisional Application Ser. No. 61/692,374, filed Aug. 23, 2012, titled RFID-BASED PLANT TRACKING AND DATA MANAGEMENT SYSTEM FOR A GREENHOUSE, the entire disclosure of which is expressly incorporated by reference herein.

FIELD

The present invention relates to methods and apparatus for tracking plants and managing data in a greenhouse and, in particular, to methods for and apparatus for tracking plants and managing data in a greenhouse using attached identification tags.

BACKGROUND AND SUMMARY

Information relating to individual plants within a greenhouse is kept and updated in a database. Information in the database may include data relating to the pollen donor and recipient, current location and status, outcomes of the plant including number and quality of seeds generated, or other desired information. As plants are moved throughout the greenhouse, data relating to the current location and status may be updated. A more automated system for tracking plants and managing data relating to the plants in a greenhouse is desired.

In an exemplary embodiment of the present disclosure, a method for tracking the position and status of plants or plant parts in a greenhouse is provided. In one embodiment, the method comprises the steps of pollinating a first plant with pollen from a second plant, each of the first and second plants having an associated identification; associating a identification tag with a data record including the identifications of the first plant and the second plant; attaching the identification tag to seeds produced from pollinating the first plant with the second plant; harvesting the seeds from the first plant; moving the harvested seeds and the attached identification tag to a harvest area; detecting the presence of the identification tag in a harvest area with an interrogation system, the interrogation system receiving an identification signal generated by the identification tag in the harvest area, the presence of the identification tag in the harvest area indicating that the attached seeds have been harvested; and updating the data record to indicate the seeds have been harvested.

In another exemplary embodiment of the present disclosure, a method for tracking the position and status of plants or plant parts in a greenhouse is provided. The method comprising pollinating a first plant with pollen from a second plant, each of the first and second plants having an associated identification; associating an identification tag with a data record including the identifications of the first plant and the second plant; and attaching the identification tag to seeds produced from pollinating the first plant with the second plant by receiving the seeds in a bag, the bag supporting the identification tag.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to sectioning an ear of maize, it should be understood that the features disclosed herein may have application to the cutting of other samples.

Figure 1:
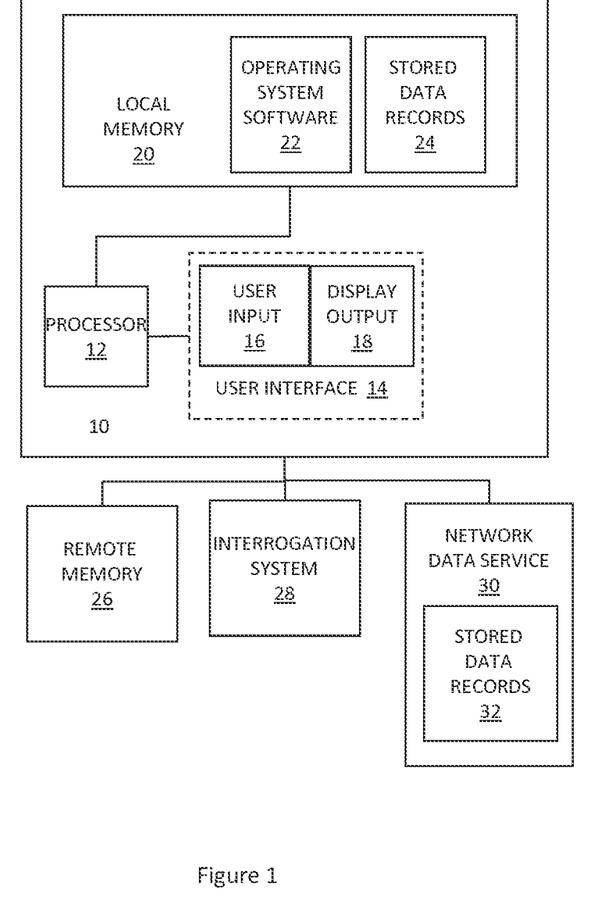
FIG. 1 illustrates an exemplary controller.

Referring first to FIG. 1, exemplary controller 10 is illustrated. An exemplary controller 10 includes a RFID reader, such as an Intermec IF61 reader for example. In one embodiment, controller 10 includes a processor 12. Processor 12 may comprise a single processor or may include multiple processors, located either locally with controller 10 or accessible across a network. Processor 12 has access to local memory 20 or a remote memory 26. Memory 20, 26 is a computer readable medium and may be a single storage device or may include multiple storage devices. Memory includes local memory 20 located with controller 10 and remote memory 26 located remotely from controller 10 and accessible across a network. Computer-readable media may be any available media that may be accessed by processor 12 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by processor 12. In one embodiment, controller 10 communicates data, status information, or a combination thereof to a remote device for analysis.

In the illustrated embodiment, local memory 20 includes operating system software 22, such as LINUX operating system or WINDOWS operating system available from Microsoft Corporation of Redmond Wash. Local memory 20 further includes communications software if computer system has access to a network, such as a local area network, a public switched network, a CAN network, and any type of wired or wireless network. Any exemplary public switched network is the Internet. Exemplary communications software includes e-mail software and internet browser software. Other suitable software which permit controller 10 to communicate with other devices across a network may be used.

Local memory 20 may also include stored data records 24. Controller 10 may also be connected to network data service 30 containing stored data records 32. An exemplary network data service 30 includes ZeaTraits database system, available from Exelixis Plant Sciences, South San Francisco, Calif.

In the exemplary embodiment illustrated in FIG. 1, controller 10 includes a user interface 14 having one or more I/O modules which provide an interface between an operator and controller 10. Exemplary I/O modules include user input 16 and display output 18. Exemplary user input 16 includes buttons, switches, keys, a touch display, a keyboard, a mouse, and other suitable devices for providing information to controller 10. Exemplary display output 18 includes lights, a display (such as a touch screen), printer, speaker, visual devices, audio devices, tactile devices, and other suitable devices for presenting information to an operator.

Figure 2A:
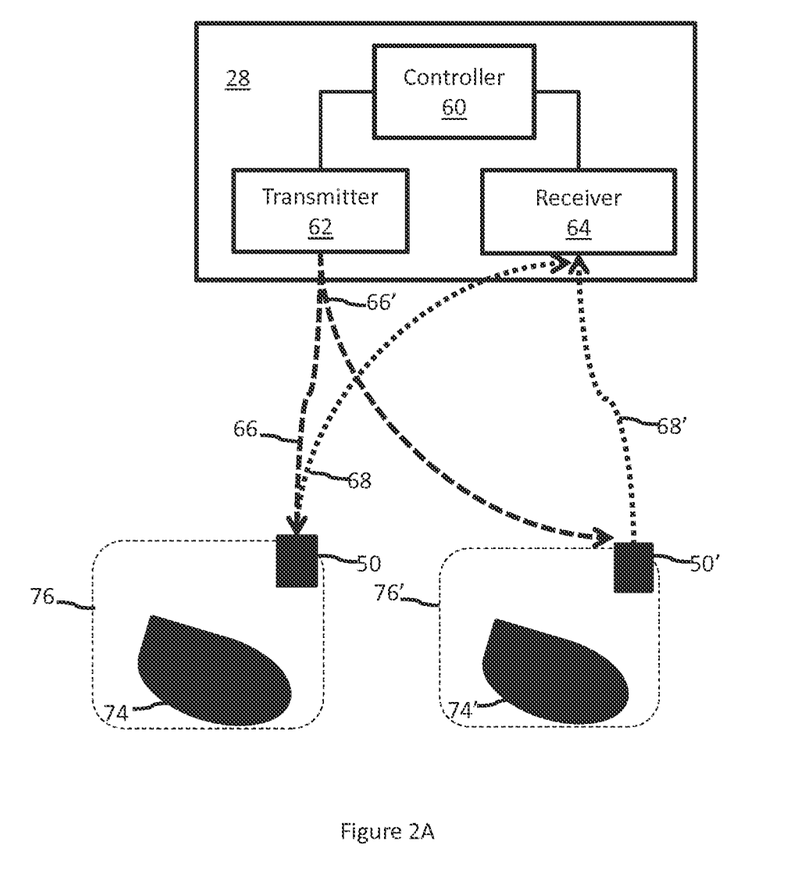
FIG. 2A illustrates an exemplary interrogation system.
Figure 2B:
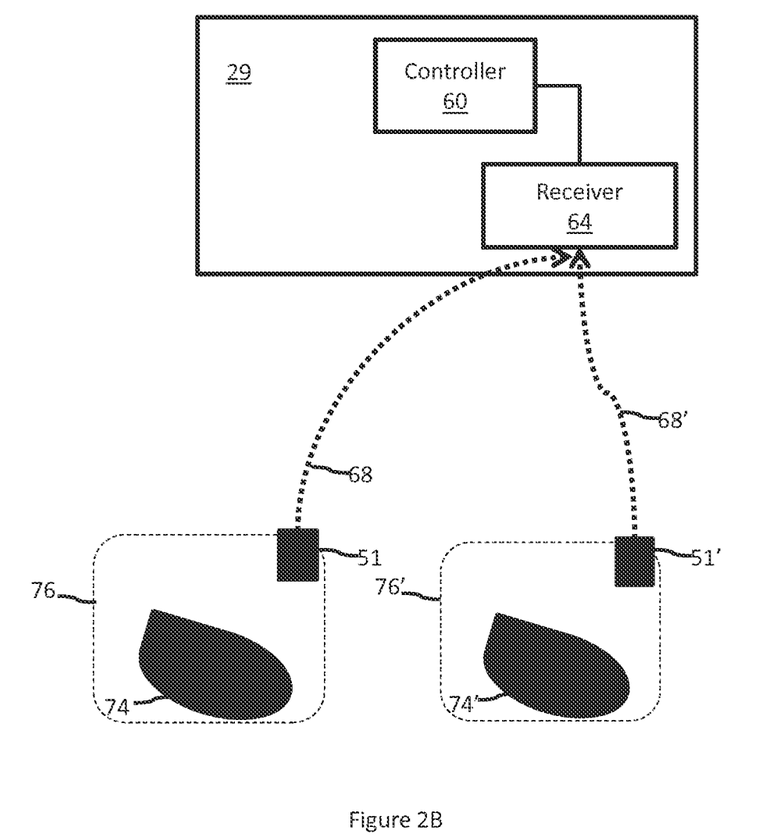
FIG. 2B illustrates another exemplary interrogation system.

Referring next to FIGS. 2A and 2B, in the illustrated embodiment, an identification tag 50 is attached to a bag 76 containing a portion 74 of plant 70. In one embodiment, identification tag 50 is a passive identification tag which receives excitation energy from an external source. In another embodiment, identification tags 50 are active identification tags including a power source.

In the exemplary embodiment illustrated in FIG. 2A, identification tags 50, 51 are resonant circuits which emit an excitation or interrogation signal of given frequency. An exemplary resonant circuit is a radio frequency identification ("RFID") circuit. Interrogation system 28 includes a transmitter 62 that sends out an interrogation signal 66, 66'. Each identification tag 50, 50' provides an identification signal 68, 68' in response to the interrogation signal 66, 66' which is received by receiver 64 on interrogation system. Transmitter 62 and receiver 64 are coupled to a controller 60 of interrogation system 28. In one exemplary embodiment, interrogation signals 66 and 66' are the same signal and identification tags 50, 50' provide different identification signals 68, 68' in response to the interrogation system 66, 66'. In another exemplary embodiment, interrogation signals 66 and 66' are different signals, and identification tag 50 provides identification signal 68 in response to interrogation signal 66 and identification tag 50' provides identification signal 68' in response to interrogation signal 66'.

In the exemplary embodiment illustrated in FIG. 2B, active identification tags 51, 51' are similar to identification tags 50, 50' of FIG. 2A. However, active identification tags 51, 51' provide identification signals 68, 68' automatically without receiving an interrogation signal. Interrogation system 29 is similar to interrogation system 28 of FIG. 2A, but does not include a transmitter 62. Each active identification tag 51, 51' continuously provides identification signal 68, 68' which is received by receiver 64 of interrogation system 29. Receiver 64 is coupled to controller 60 of interrogation system 29. In one exemplary embodiment, active identification tags 51, 51' continuously provide identification signals 68, 68'. In another exemplary embodiment, active identification tags 51, 51' periodically provide identification signals 68, 68'.

Figure 3A:
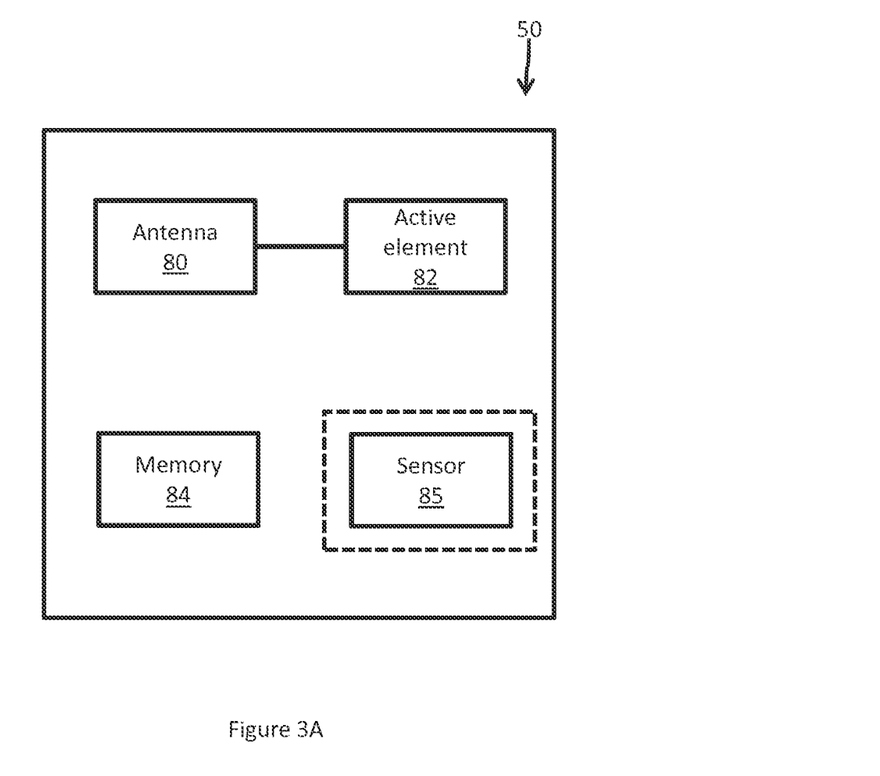
FIG. 3A illustrates an exemplary identification tag.

Referring next to FIG. 3A, identification tag 50 includes an antenna 80 which receives an interrogation signal 66 having a first frequency from transmitter 64 and emits a identification signal 68 having a second frequency. In one exemplary embodiment, the frequency of the interrogation signal 66 is the same as the frequency of the identification signal 68. In another exemplary embodiment, the frequency of the interrogation signal 66 is different from the frequency of the identification signal 68. In one embodiment, identification tag 50 includes an active element 82 used to change the response frequency or modulate the response signal. In another embodiment, identification tag 50 includes a surface acoustic wave ("SAW") device to create a modulated signal including identification data without an active control element.

In one exemplary embodiment, each identification tag 50 has a unique identifier that is associated with the identification signal 68. In one embodiment, each identification tag 50 further includes memory 84 that can be read by interrogation system 28. Memory is a computer readable medium and may be a single storage device or may include multiple storage devices. Computer-readable media may be any available media that may be accessed by interrogation system 28 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by interrogation system 28. In one embodiment, interrogation system 28 can write information to or rewrite information on the memory 84. Exemplary information that may be stored in memory 84 includes an identification of the attached plant 70 or portion 74 of plant, the last recorded location of the identification tag 50, an experimental protocol associated with the attached plant 70, experimental results associated with the attached plant, polymerase chain reaction (PCR) test results associated with the attached plant, and the parentage of the plant 70. In one embodiment, the information in memory 84 is accessed by a user with an interrogation system, including a handheld interrogation system (not shown). In another embodiment, the handheld interrogation system (not shown) has read/write access to at least some memory 84 of identification tag 50. In one embodiment, the information in memory 84 is encrypted or password protected. An operator accessing the encrypted or password protected information from or through an interrogation system, such as interrogation system 28 or 29, or stored in memory such as local memory 20, remote memory 26, data service 30, backup databases 56, 58, and memory 84, is unable to access the information without providing an encryption key or correct password.

In one exemplary embodiment, controller 60 of interrogation system 28 causes transmitter 62 to emit an interrogation signal 66. Each identification tag 50, 50' is tuned to the interrogation signal 66 and provides a identification signal 68, 68' identifying the identification tag 50, 50'. Identification signals 68, 68' are received by receiver 64. Controller 60 determines the presence of identification tags 50, 50' based on the identification signals 68, 68' received by receiver 64, In another exemplary embodiment, controller 60 includes a frequency sweep generator and causes transmitter 62 to emit a plurality of discrete interrogation signals 66, 66' across a frequency spectrum. Although FIG. 2A illustrates only two discrete interrogation signals, more signals may be emitted. Each of identification tags 50 is tuned to a respective interrogation frequency included in the frequency spectrum. Each identification tag 50, 50' provides a respective identification signal 68, 68' at a discrete frequency in response to receiving the respective interrogation signal 66, 66'.

Figure 3B:
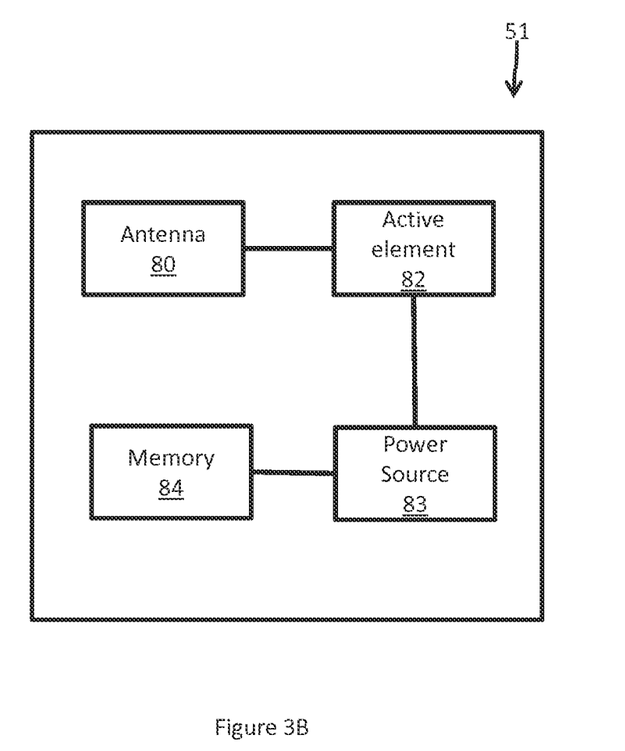
FIG. 3B illustrates another exemplary identification tag

Referring next to FIG. 3B, another exemplary identification tag 51 is illustrated. Active identification tag 51 is similar to identification tag 50 illustrated in FIG. 3A. Active identification tag 51 further includes a power source 83, for example a battery.

In one embodiment, antenna 80 of active identification tag 51 emits an identification signal 68 (see FIG. 2B) without first receiving an interrogation signal 66. In one exemplary embodiment, each identification tag 51 has a unique identifier that is associated with the identification signal 68. In one exemplary embodiment, active identification tags 51, 51' continuously provide identification signals 68, 68'. In another exemplary embodiment, active identification tags 51, 51' periodically provide identification signals 68, 68'.

In another embodiment (not shown), identification tag 50 is a semi-passive tag. In this embodiment, semi-passive identification tag 50 includes a power source 83, which is used to power the identification tag 50 except for the antenna 80. The semi-passive identification tag 50 uses power from an interrogation signal 66 from an interrogation system 28 and the power source 83 to provide a identification signal 68 (see FIG. 2A).

In one embodiment, identification tag 50 includes one or more sensors 85 for measuring an environmental characteristic. Exemplary environmental characteristics include pressure, temperature, moisture, humidity, chemical presence or reactivity, strain, and other suitable measurable characteristics. In one embodiment, identification tag 50 stores the result of the sensor measurement in memory 84 (see FIG. 3). In another embodiment, identification tag 50 provides the result of the sensor measurement to interrogation system 28 or a handheld interrogation system (not shown) using identification signal 68, 68' (see FIGS. 2A and 2B).

Figure 4:
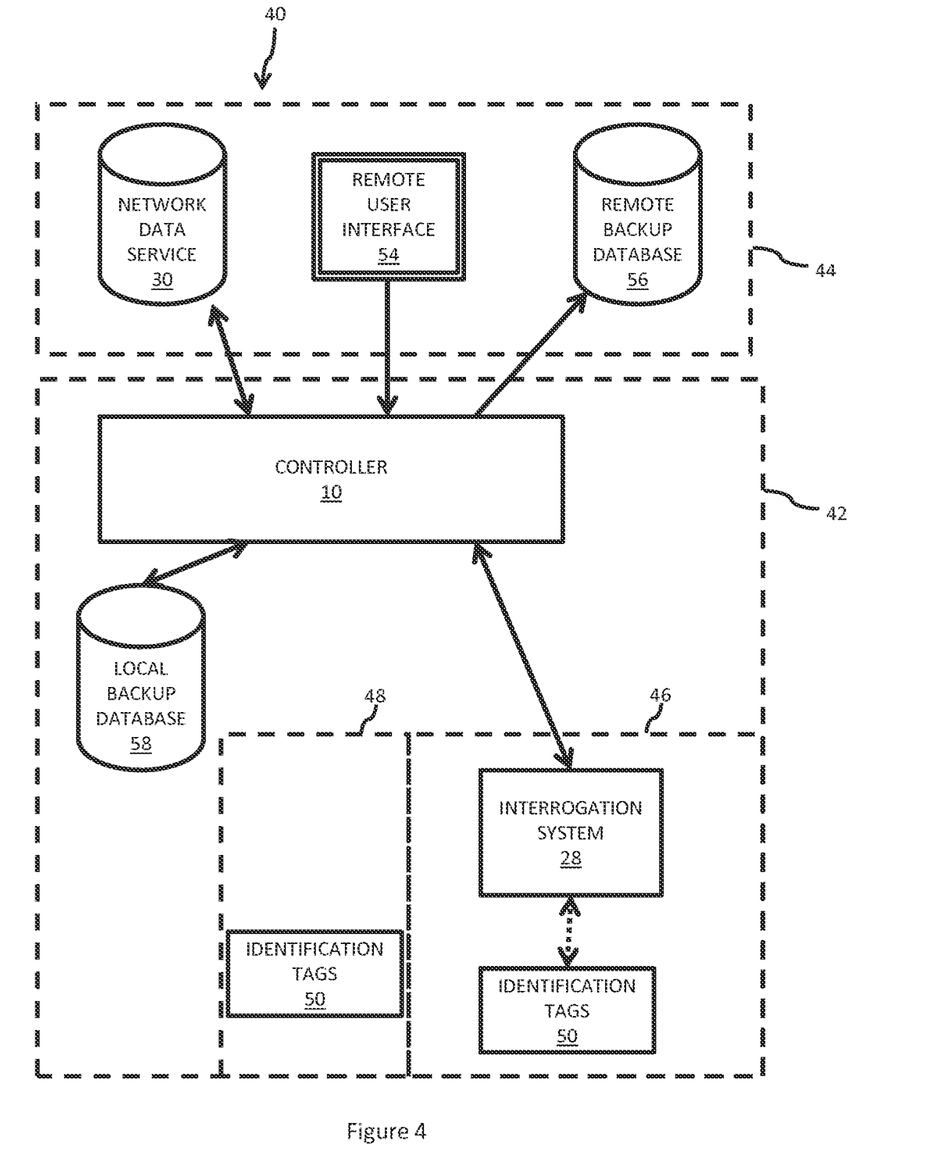
FIG. 4 illustrates an exemplary system for tracking plants in a greenhouse.

Referring next to FIG. 4, an exemplary tracking system 40 is illustrated. FIG. 4 illustrates a local area 42 and remote area 44. Although illustrated as a single area, remote area 44 may include a plurality of different areas. As illustrated, local area 42 includes a first greenhouse area 46 containing an interrogation system 28 and a second greenhouse area 48 which does not contain an interrogation system 28. Interrogation system 28 detects the presence of identification tags 50 positioned in first greenhouse area 46, but not the presence of identification tags 50 positioned in second greenhouse area 48. Exemplary identification tags 50 include RFID tags such as passive UHF squiggle tags.

In the illustrated embodiment, tracking system 40 includes remote user interface 54. Remote user interface 54 includes one or more I/O modules which provide an interface between an operator who is remote from controller 10 and controller 10. Exemplary I/O modules include user input such as buttons, switches, keys, a touch display, a keyboard, a mouse, and other suitable devices for providing information to controller 10 and display outputs such as lights, a display (such as a touch screen), printer, speaker, visual devices, audio devices, tactile devices, and other suitable devices for presenting information to a remote operator. In one embodiment, remote user interface 54 is similar to user interface 14, but accessible over the internet or other network connection.

In the exemplary embodiment illustrated in FIG. 4, controller 10 is further connected to remote backup database 56 and local backup database 58. In other embodiments, remote backup database 56, local backup database 58, or both are not provided. Remote backup database 56 and local backup database 58 provide remote memory 26 (see FIG. 1) for controller 10. Copies of stored data records 24, 32, are stored on remote backup database 56 and local backup database 58. Remote backup database 56 and local backup database 58 are used to provide access for controller 10 to data records when access to a network data service 30 is unavailable. In one embodiment, network data service 30 communicates directly with remote backup database 56 and local backup database 58.

Figure 5:
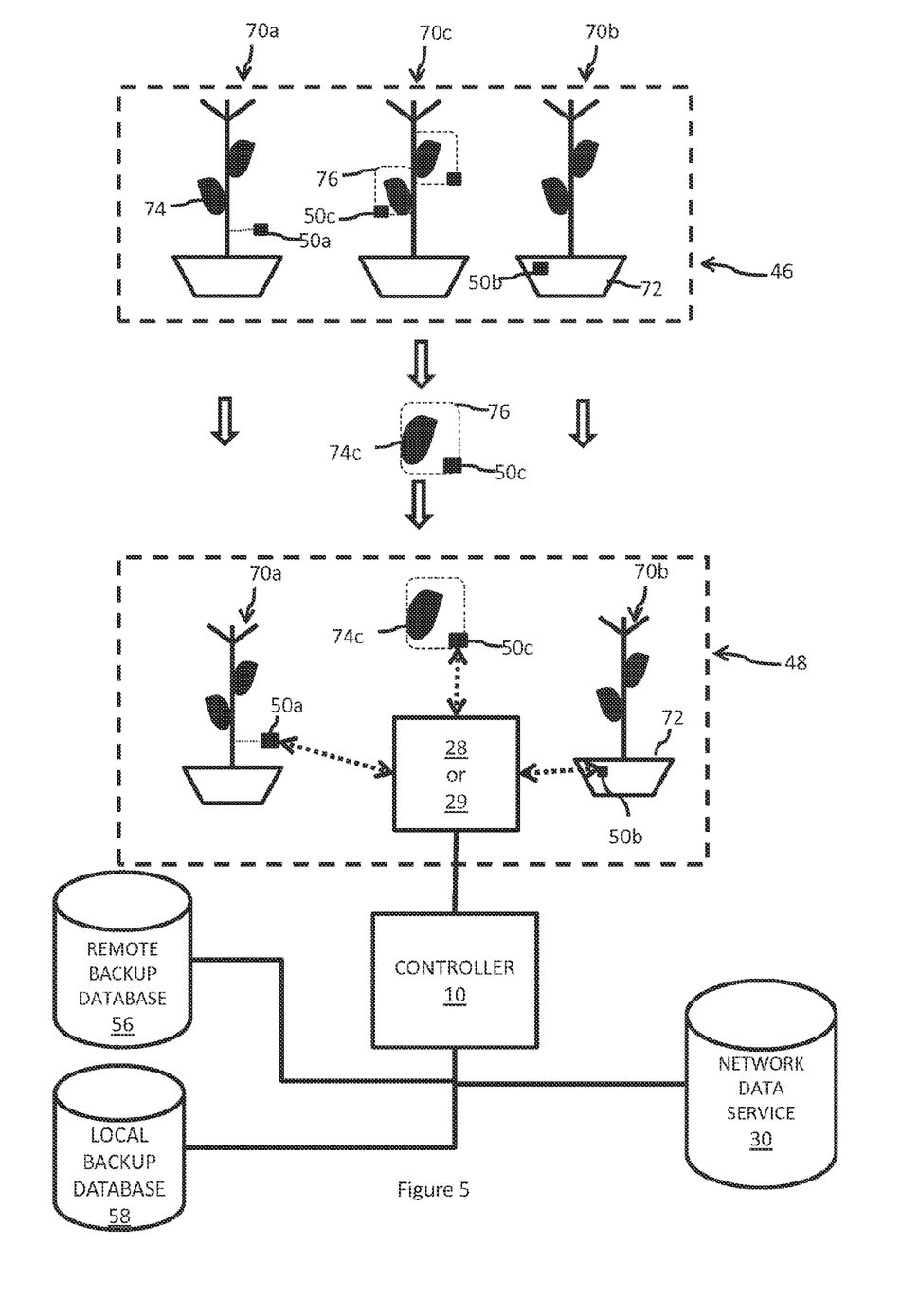
FIG. 5 illustrates an exemplary workflow using a system for tracking plants in a green house.

Referring next to FIG. 5, an exemplary workflow using a system for tracking plants in a greenhouse is illustrated. A plurality of plants 70 are illustrated in a first greenhouse area 46. In one embodiment, first greenhouse area is a growing area. Each plant 70 is tagged with a identification tag 50. As illustrated in FIG. 5, in one exemplary embodiment, an identification tag 50a is directly attached to plant 70a. In another illustrated embodiment, plant 70b is in a container 72, and an identification tag 50b is attached to the container 72. In still another illustrated embodiment, an identification tag 50c is attached to only a portion 74 of the plant 70. Exemplary portions 74 of the plant 70 include maize ears, fruits, stalks, seeds, roots, flowers, branches, and other suitable portions.

Each plant 70a, container 72 containing plant 70b, or portion 74 of plant 70c and its associated identification tag 50 is then moved from the first greenhouse area 46 to the second greenhouse area 48. As illustrated in FIG. 5, in an embodiment in which an identification tag 50c is attached to a portion 74 of plant 70, the portion 74 may be harvested or otherwise removed from the plant prior to moving each plant 70a, container 72 containing plant 70b, or portion 74 of plant 70c and its associated identification tag 50 to the second greenhouse area 48. Second greenhouse area 48 contains an interrogation system 28, 29, which detects the presence of identification tags 50 positioned in second greenhouse area 48, but not the presence of identification tags 50 positioned in first greenhouse area 46.

In one exemplary embodiment, interrogation system 28 detects the presence of identification tags 50a, 50b, 50c in second greenhouse area 48 by receiving identification signals 68 in response to interrogation signals 66 (see FIG. 2A). In another exemplary embodiment, identification tags 50a, 50b, 50c are active interrogation tags 51 and interrogation system 29 detects the presence of identification tags 50a, 50b, 50c in second greenhouse area 48 by receiving identification signals 68 from the identification tags 50a, 50b, 50c without the need for an interrogation signal 66 from a transmitter 62 (see FIG. 2B). Interrogation system communicates the presence of identification tags 50a, 50b, and 50c in the second greenhouse area 48 to the controller 10. Controller 10 then automatically updates data records associated with identification tags 50a, 50b, 50c in network data service 30 or other database 56, 58.

Figure 6:
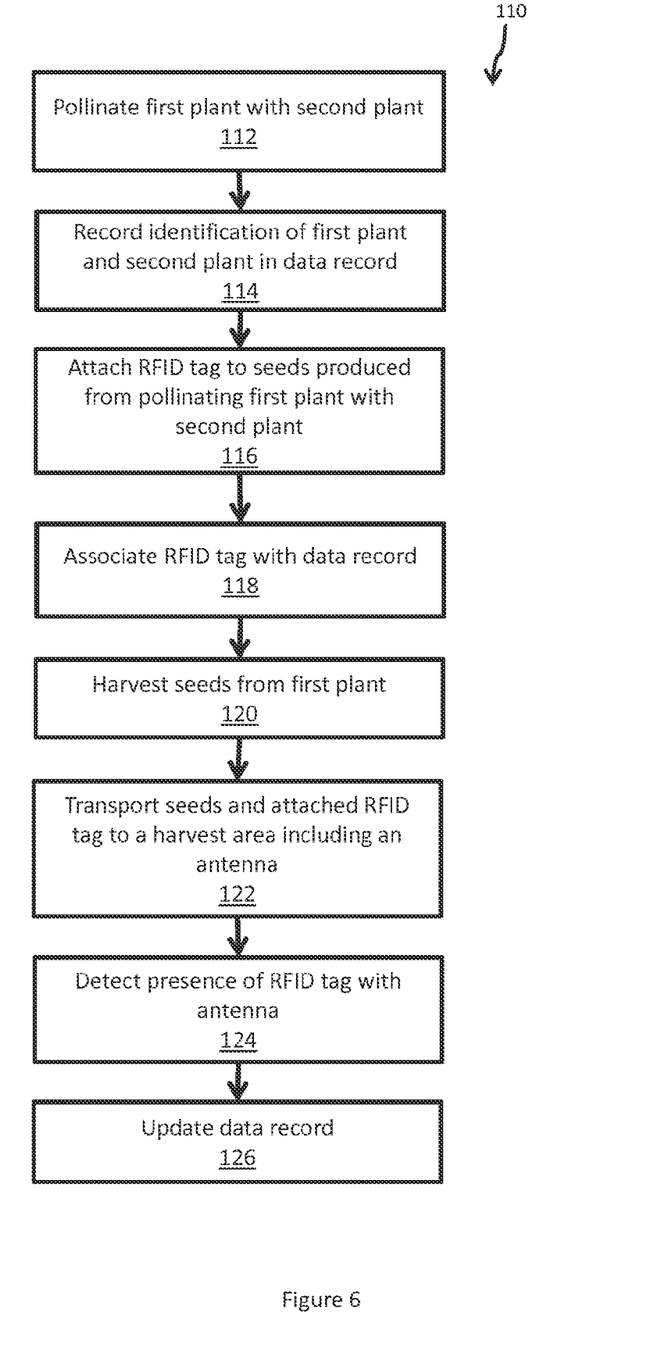
FIG. 6 illustrates an exemplary method for tracking plants in a greenhouse.

Referring next to FIG. 6, an exemplary tracking method 110 is illustrated. In block 112, a first plant is pollinated with pollen from a second plant. In block 114, the identification of the first plant and second plant are recorded in a data record. The data record may be stored in memory in at least one of local memory 20 of controller 10, network data service 30, and/or a database, such as remote backup database 56 or local backup database 58.

In block 116, an identification tag 50 is attached to seeds produced from pollinating the first plant with the second plant. In block 118, the identification tag 50 is associated with the data record. In one exemplary embodiment, the identification tag 50 is associated with a unique identifier, and the unique identifier is entered into the data record created in block 114. In an exemplary embodiment, the first and second plants are maize, and the RFID tag 50c is attached to a bag 76 placed over a developing ear containing the seeds.

In block 120, the seeds are harvested. In an exemplary embodiment, the bag containing the ear of maize is removed from the first plant along with the bag 76 and tag 50c. In block 122, the seeds, bag 76, and attached identification tags 50 are transported to a harvest area of the greenhouse. The harvest area has an interrogation system 28 for detecting the presences of identification tags 50 in the harvest area. In block 124, the identification tags 50 in the harvest area are detected. In one exemplary embodiment, an interrogation system 28 located in the harvest area sends out interrogation signals 66 and receives back identification signals 68 from a plurality of identification tags 50 located in the harvest area (See FIG. 2A). In another exemplary embodiment, identification tags 50 are active interrogation tags 51 and interrogation system 29 detects the presence of identification tags 50 in second greenhouse area 48 by receiving identification signals 68 from the identification tags 50 without the need for an interrogation signal 66 from a transmitter 62 (see FIG. 2B).

In block 126, the data records associated with the identification tags 50 detected in block 124 are updated. In one embodiment the current location of the identification tag 50 in the data record is updated to the harvest area. In one embodiment, the status of the plant 70 or plant portion 74 is updated to reflect that the seeds have been harvested.

In another embodiment, an interrogation system 28 or 29 is located at an entrance or exit location for the greenhouse 42. In this embodiment, interrogation system 28 or 29 detects identification tags 50 associated with attached plants 70, containers 72, or plant parts 74 entering or exiting the greenhouse through the location. In yet still another embodiment, an interrogation system 28 or 29 is located at an entrance to a research and development portion of the greenhouse 42. In this embodiment, interrogation system 28 or 29 detects identification tags 50 associated with attached plants 70, containers 72, or plant parts 74 entering or exiting the research and development portion.

In one embodiment, the data records stored in local memory 20, remote memory 26, data service 30, backup databases 56, 58, and memory 84 are related to the location of the identification tag 50 and attached plant 70, container 72, or plant part 74. Exemplary location data includes the current location of the identification tag 50, the arrival time of the identification tag 50 in each recorded location, the last recorded time in each recorded location, and the amount of time spent in each recorded location.

In another embodiment, the data records stored in local memory 20, remote memory 26, data service 30, backup databases 56, 58, and memory 84 are related to the status of the identification tag 50 and attached plant 70, container 72, or plant part 74. Exemplary status data includes the parentage of the associated plant or plant part, the date of pollination, the date seeds were harvested, the expected harvest date, the results of experiments or other analysis, and environmental characteristics or conditions.

In still another embodiment, the data records stored in local memory 20, remote memory 26, data service 30, backup databases 56, 58, and memory 84 are related to action items associated with the identification tag 50 and attached plant 70, container 72, or plant part 74. Exemplary action items includes pollination dates, watering and nutrient requirements and schedules, dates or times to be moved to another location, harvest dates, and dates for samples to be taken or experiments to be conducted. In an exemplary embodiment, one or more users associated with the action item is automatically notified of a current or upcoming action item. In one embodiment, the notification is based at least in part by the presence of an identification tag in a certain location. In another embodiment, the notification is based at least in part on an environmental characteristic determined by a sensor.

In one embodiment, at least one of local memory 20, remote memory 26, data service 30, backup databases 56, 58, and memory 84 maintains a record log of changes to data associated with identification tag 50, including location data, status data, warning data, action items, and reports.

In one embodiment, the interrogation signals 66 periodically monitor the presence of identification tags 50 in the harvest area by periodically sending out interrogation signals 66 and automatically updating the data records associated with the identification signals 68 received back. In this embodiment, information related to many plants 70 or plant portions 74 is monitored and updated in a remote database, such as network database service 30, without user intervention at each step of the process. In another embodiment, the data records associated with the identification signals 68 are queried, and the results shown to a user for review prior to updating the data records.

In one embodiment, the controller 10 is provided a list of expected identification tags 50 and compares the data records associated with the controllers of the received identification signals 68 and alerts a user when either an expected identification tag 50 is not present in the area or when a identification tag 50 not expected is present based on the presence of absence of a identification signal 68 associated with that identification tag 50.

Implementing identification tags 50 and interrogation systems 28 facilitates trait discovery in plants 70. Repetitive actions of managing plants 70 in a greenhouse 42 in a seed management area, in the laboratory, and in the field are significantly automated, allowing optimization of research activity. Automation of tracking systems allows for a consistent supply of information, such as the genetics and parentage, of plants 70 and plant parts 74 (such as seeds) being evaluated. Quick access to genetics and parentage information allows for more efficient transformation efforts and more effective screening and field trials. Automation of tracking systems further allows for maintaining a chain of custody for plants 70 or plant parts 74.

In some embodiments, automated access to information regarding harvested plants allows for enhanced quality control sorting. Plants 70 or plant parts 74 can be quickly categorized based on one or more criteria. Plants 70 or plant parts 74 meeting the criteria are maintained for further processing, while plants 70 or plant parts 74 not meeting the criteria are discarded. Exemplary criteria may be based on genetics or parentage information, information obtained by sensors 85, the position or status information stored in local memory 20, remote memory 26, data service 30, backup databases 56, 58, and memory 84, whether certain action items were performed.

In other embodiments, at least one of local memory 20, remote memory 26, data service 30, and backup databases 56, 58 is in communication with a field database (not shown) containing data records relating to plantings of plants in the field. In these embodiments, identification tag 50 remains with plant 70, plant container 72, or plant part 74 after it is removed from the greenhouse 42. A field interrogation system, similar to interrogation systems 28 or 29, detects the presence of identification tag 50 in a field area and updates a corresponding data record. Because the field database is in communication with at least one of local memory 20, remote memory 26, data service 30, and backup databases 56, 58, the field database has access to the data records associated with identification tag 50. In some embodiments, detection of identification tag in a field area triggers field action items, including the movement and receipt of materials associated with plant 70, plant container 72, or plant part 74 associated with identification tag 50.

In an exemplary embodiment of the present disclosure, a method for tracking the position and status of plants or plant parts in a greenhouse is provided. The method comprising: pollinating a first plant with pollen from a second plant, each of the first and second plants having an associated identification; associating an identification tag with a data record including the identifications of the first plant and the second plant; attaching the identification tag to seeds produced from pollinating the first plant with the second plant; harvesting the seeds from the first plant; moving the harvested seeds and the attached identification tag to a harvest area; detecting the presence of the identification tag in the harvest area with an interrogation system, the interrogation system receiving an identification signal generated by the identification tag in the harvest area, the presence of the identification tag in the harvest area indicating that the attached seeds have been harvested; and updating the data record to indicate the seeds have been harvested.

In one example, the method further comprises the steps of: providing an expected date of harvest for each data record; and issuing an alert if the identification tag is detected in the harvest area prior to the expected date of harvest.

In another example, the method further comprises the steps of: providing a last expected date of harvest for each data record; and issuing an alert if the identification tag has not been detected in the harvest area prior to the last expected date of harvest.

In yet another example, the identification tag is an RFID tag. In a variation thereof, the RFID tag further includes a power source.

In still another example, the identification tag further includes a sensor and the method further comprising the step of measuring an environmental characteristic with the sensor.

In still another example, the detecting step comprises providing an interrogation signal in the harvest area with a transmitter and receiving an identification signal from the identification tag in the harvest area in response to the interrogation signal.

In still a further example, the method further comprises notifying a user that the identification tag is present in the harvest area.

In yet still another example, the identification tags further includes a computer readable device containing information relating to the identification of the first plant or a portion of the first plant and the location of the first plant or the portion of the first plant.

In yet a further example, the method further comprises providing an expected location for the seeds and alerting a user if the seeds are not detected in the expected location.

In another still example, the step of attaching the identification tag to seeds produced from pollinating the first plant with the second plant includes the step of receiving the seeds of the first plant in a bag, the bag supporting the identification tag. In a variation thereof, the seeds of the first plant are connected to the first plant when the seeds of the first plant are received in the bag. In a refinement thereof, the first plant is maize and the step of receiving the seeds of the first plant in the bag includes the step of placing the bag over an ear of the first plant, the ear including the seeds. In another refinement thereof, the method further comprises the step of removing the bag containing the ear and the ear from the first plant. In a further refinement thereof, the identification tag is an RFID tag.

In another exemplary embodiment of the present disclosure, a method for tracking the position and status of plants or plant parts in a greenhouse is provided. The method comprising pollinating a first plant with pollen from a second plant, each of the first and second plants having an associated identification; associating an identification tag with a data record including the identifications of the first plant and the second plant; and attaching the identification tag to seeds produced from pollinating the first plant with the second plant by receiving the seeds in a bag, the bag supporting the identification tag.

In an example thereof, the method further comprises the steps of: harvesting the seeds from the first plant; moving the harvested seeds and the attached identification tag to a harvest area; detecting the presence of the identification tag in the harvest area; and updating the data record to indicate the seeds have been harvested.

In another example thereof, the first plant is maize and the step of receiving the seeds of the first plant in the bag includes the step of placing the bag over an ear of the first plant, the ear including the seeds.

In still another example thereof, the method further comprises the step of removing the bag containing the ear and the ear from the first plant.

In yet another example thereof, the identification tag is an RFID tag.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A method for tracking the position and status of plants or plant parts in a greenhouse comprising:
   pollinating a first individual parent plant with pollen from a second individual parent plant, each of the first individual parent and second individual parent plants having an associated identification;
   associating an identification tag with a data record including the identifications of the first individual parent plant and the second individual parent plant;
   attaching the identification tag to seeds produced from pollinating the first individual parent plant with the second individual parent plant;
   harvesting the seeds from the first individual parent plant;
   moving the harvested seeds and the attached identification tag to a harvest area;
   detecting the presence of the identification tag in the harvest area with an interrogation system, the interrogation system receiving an identification signal generated by the identification tag in the harvest area, the presence of the identification tag in the harvest area indicating that the attached seeds have been harvested; and
   updating the data record to indicate the seeds have been harvested.

2. The method of claim 1, further comprising the steps of:
providing an expected date of harvest for each data record; and
issuing an alert if the identification tag is detected in the harvest area prior to the expected date of harvest.

3. The method of claim 1, further comprising the steps of:
providing a last expected date of harvest for each data record; and
issuing an alert if the identification tag has not been detected in the harvest area prior to the last expected date of harvest.

4. The method of claim 1, wherein the identification tag is an RFID tag.

5. The method of claim 4, wherein the RFID tag further includes a power source.

6. The method of claim 1, wherein the identification tag further includes a sensor and the method further comprising the step of measuring an environmental characteristic with the sensor.

7. The method of claim 1, wherein the detecting step comprises providing an interrogation signal in the harvest area with a transmitter and receiving an identification signal from the identification tag in the harvest area in response to the interrogation signal.

8. The method of claim 1, further comprising notifying a user that the identification tag is present in the harvest area.

9. The method of claim 1, wherein the identification tags further includes a computer readable device containing information relating to the identification of the first individual parent plant or a portion of the first individual parent plant and the location of the first individual parent plant or the portion of the first individual parent plant.

10. The method claim 1, further comprising providing an expected location for the seeds and alerting a user if the seeds are not detected in the expected location.

11. The method of claim 1, wherein the step of attaching the identification tag to seeds produced from pollinating the first individual parent plant with the second individual parent plant includes the step of receiving the seeds of the first individual parent plant in a bag, the identification tag being fixedly coupled to the bag.

12. The method of claim 11, wherein the seeds of the first individual parent plant are connected to the first individual parent plant when the seeds of the first individual parent plant are received in the bag.

13. The method of claim 12, wherein the first individual parent plant is maize and the step of receiving the seeds of the first individual parent plant in the bag includes the step of placing the bag over an ear of the first individual parent plant, the ear including the seeds.

14. The method of claim 13, further comprising the step of removing the bag containing the ear and the ear from the first individual parent plant.

15. The method of claim 14, wherein the identification tag is an RFID tag.

16. The method of claim 1, wherein the identification tag is attached to the seeds produced from pollinating the first individual parent plant with the second individual parent plant prior to the seeds being harvested.

17. The method of claim 1, wherein the first and second individual parent plants are within a first greenhouse area and the harvest area is within a second greenhouse area.

18. The method of claim 1, wherein the data record further includes at least one of a date of pollination, a date of harvest, an expected harvest date, a current location, a current status, a plant output quantity, and a plant output quality.

19. The method of claim 1, wherein the interrogation system is located at an entrance location of the harvest area.

20. The method of claim 19 further comprising the step of determining when the seeds enter the harvest area through the entrance location.

21. The method of claim 1, wherein the identification tag includes a unique identifier associated with the identification signal.

22. The method of claim 1, wherein the data record further includes an identification of the seeds.

* * * * *